Patented Nov. 2, 1948

2,453,085

UNITED STATES PATENT OFFICE 2,453,085

THIOPHENE-ALDEHYDE SYNTHETIC RESINS

Philip D. Caesar, Champaign, Ill., and Alexander N. Sachanen, Woodbury, N. J., assignors to Socony-Vacuum Oil Company, Incorporated, a corporation of New York No Drawing. Application November 28, 1947, Serial No. 788,650

6 Claims. (Cl. 260—57)

This invention relates to the condensation of thiophene with aldehydes, and is more particularly concerned with the method of preparing valuable synthetic resins through the condensation of thiophene with aldehydes and/or the co-condensation of thiophene and phenol with aldehydes.

Condensation reactions are well known and connote reactions that involve the union, under suitable conditions, between atoms in the same or different molecules to form new compounds of greater complexity and higher molecular weight. Ordinarily, the condensation is effected in the presence of materials, known in the art as condensing agents, that facilitate the union. The nature of the products obtained in condensation operations depends, of course, upon the type of reactants involved, the character of the condensing agents, the relative concentration of the reactants, and on the temperature, pressure, and time of reaction employed, usually referred to as condensation reaction conditions.

Condensation reactions form the basis of many processes for manufacturing some of the most important synthetic resins. These synthetic resins may be liquids, semi-solids or solids, depending upon the nature and conditions of the condensation reactions. However, they have the common properties of being amorphous, of having no tendency to crystallize, and of having somewhat complex molecular structures.

As is well known to those familiar with the art, it has been proposed to carry out the condensation of thiophene with aldehydes in the presence of appreciable amounts, of the order of 100% and up to 200%, based on the weight of thiophene in the charge, of phosphorus pentoxide as condensing agent. The products of this reaction have been invariably compounds, the molecules of which contain one or two thiophene groups. In accordance with this method of the prior art, the condensation of thiophene with formaldehyde appears to proceed as follows:

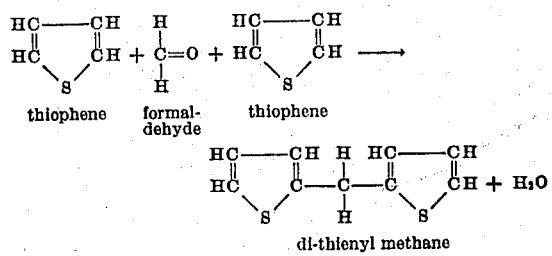

More recently, it has been proposed to carry out the reaction of thiophene with aldehydes in the presence of excess amounts, on the order of 300% and over, based on the weight of thiophene in the charge, of hydrochloric acid. In this case, in addition to thienylmethyl chloride, di-thienyl methane is formed as a main product of the reaction. The chloromethylation of aromatic hydrocarbons through the use of hydrochloric acid and formaldehyde is well known in the art, and when applied to thiophene instead of aromatic hydrocarbons, a portion at least, of the thiophene is chloromethylated. This would seem to account for the production of substantial amounts of thienylmethyl chloride in accordance with the equation:

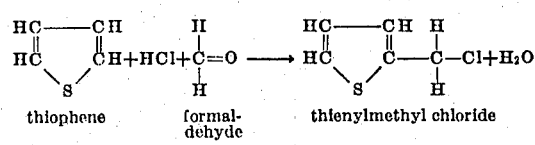

thiophene    formaldehyde    thienylmethyl chloride

The fact that appreciable amounts of dithienyl methane are also produced may be ascribed to the reactive nature of thienylmethyl chloride. It is believed that thienylmethyl chloride, in the presence of additional amounts of thiophene, reacts therewith causing HCl to split off to produce dithienyl methane in accordance with the following equation:

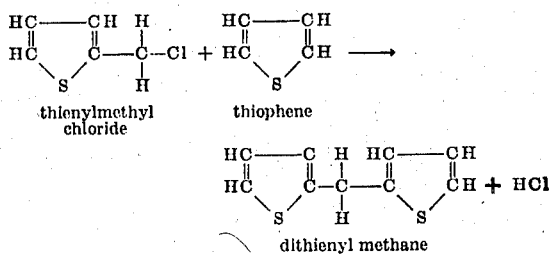

It may be stated, therefore, that the condensation of thiophene with aldehydes, in accordance with the methods known to the prior art, produced liquid or crystalline compounds having comparatively simple molecular structures and well-established chemical formulae.

We have now found that valuable synthetic resins may be prepared by condensing thiophene with aldehydes through the use of acidic condensing agents in controlled concentrations and under controlled condensation reaction conditions.

We have also found that valuable synthetic resins may be prepared by co-condensing thiophene and phenol with aldehydes, likewise through the use of acidic condensing agents in controlled concentrations and under controlled condensation reaction conditions.

It must be observed that by valuable synthetic resins we have reference to materials that can be molded or cast into forms or shapes which have considerable mechanical strength. Many condensation reactions produce powders which cannot be molded and which lack desirable mechanical properties almost entirely. For instance, the condensation of aromatic hydrocarbons with formaldehyde produces so-called formalites in the form of a powder which cannot be molded under any conditions of temperature and pressure. Such powders may be used only as fillers in the fabrication of various plastics.

It is an object of the present invention to provide a method of effecting the condensation of thiophene with aldehydes. Another object is to provide a method of effecting the co-condensation of thiophene and phenol with aldehydes. A more specific ob'ect is to provide a method of preparing valuable synthetic resins. A very important object is to afford a method capable of carrying out the above objects by effecting the condensation operation through the use of acidic condensing agents in controlled concentrations and under rigidly controlled condensation reaction conditions. Other objects and advantages of the present invention will become apparent to those skilled in the art from the following description.

Broadly stated, our invention provides a method of preparing valuable synthetic resins, which comprises reacting thiophene or a mixture of thiophene and phenol, with an aldehyde, in the presence of an acidic condensing agent in controlled concentrations, and correlating the nature of the aldehyde and of the acidic condensing agent, and the concentration of the acidic condensing agent used, together with the temperature and time of reaction to effect resinification.

In accordance with the method of the present invention, we achieve a novel type of condensation reaction between thiophene and aldehydes. This new type of condensation reaction is effected in the presence of well known acidic condensing agents; however, the concentration of the condensing agents employed and the condensation conditions are closely controlled. As contrasted with the reactions involving thiophene and aldehydes, of the prior art, our reaction does not yield liquid or crystalline compounds having comparatively simple molecular structures and well established chemical formulae; but rather, through the use of controlled concentrations of well known condensing agents and by carrying out the reaction under controlled condensation reaction conditions, it produces amorphous substances having complex molecular structures and useful as synthetic resins.

As a result of the new type of condensation reaction of the present invention, between thiophene and aldehydes, a liquid product, a resilient rubber-like product, or a solid product may be produced. These three products are modifications of the condensation reaction product that is formed, and represent various stages of resinification. Accordingly, and without limiting the scope of our invention, our type of condensation of thiophene with aldehydes may be postulated to proceed as folows: A primary reaction produces a thienyl methanol in accordance with the equation:

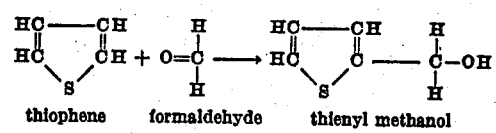
thiophene   formaldehyde   thienyl methanol

Further condensation of the alcohol is accompanied by the splitting off of water to produce the condensation products of our invention in accordance with the following formula:

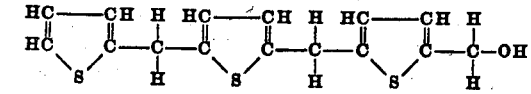

The degree of condensation and the molecular weight of the product obtained depend upon a number of factors to be discussed hereinafter, it being obvious that the degree of condensation will establish the stage of resinification achieved and thus determine whether the product obtained will be a liquid, a resilient rubber-like mass, or a solid, the solid product being characterized by a substantially complete absence of hydroxyl groups and representing the ultimate stage of resinification, the liquid product representing more or less the first stage of resinification, and the resilient rubber-like mass representing intermediate stages of resinification.

The rate and control of our new type of condensation reaction between thiophene and aldehydes depend upon many factors. These may be listed as follows:

1. Nature of acidic condensing agent
2. Concentration of acidic condensing agent used
3. Nature of aldehyde
4. Character of the system
5. Ratio of aldehyde to thiophene
6. Temperature
7. Time These factors may vary in character or magnitude, hence, they may be referred to, more appropriately, as reaction variables. It must be understood, however, that they are more or less interdependent, therefore, when one is arbitrarily fixed, the limits within which the others may be varied are somewhat restricted. In any particular case, for instance, with a given acidic condensing agent and a given aldehyde, the most desirable magnitude of each of the remaining reaction variables can be readily ascertained by one skilled in the art, the limits within which these reaction variables may vary being indicated hereinafter.

As stated hereinbefore, any of the well known acidic condensing agents is suitable for the method of our invention. Generally speaking, acids and salts of a weak base and a strong acid have been found to be very effective condensing agents for carrying out our condensation reaction. By way of non-limiting examples, sulfuric acid, hydrochloric acid, maleic acid, phosphoric acid, and anhydrous hydrofluoric acid may be mentioned as suitable acids, while ammonium chloride, zinc chloride, mercuric chloride, and ammonium sulphate may be mentioned as suitable salts for use as condensing agents in the condensation reaction of our invention. We have found, however, that the nature of the condensing agent employed affects the time and temperature required to effect the first stage of resinification referred to hereinbefore. With respect to the acids and salts referred to, it may be stated that their condensing activity varies directly with the strength of the acid used as condensing agent, or with the strength of the acid produced by hydrolysis of the salt used as condensing agent, and hence, the time and temperature required to effect the first stage of resinification vary inversely as the strength of the acid employed or of the acid produced by hydrolysis. It must be understood, that when we speak of strength of the acid, we have reference to the degree of ionization and not to the concentration of acid employed or produced.

If a strong acid, for example, sulfuric acid, is employed as condensing agent, in practice, the amount used is small and varies between 0.1% and 10% by weight, based on the weight of the thiophene reactant, although the total amount used, if desired, may be many times the weight of thiophene in the charge. On the other hand, if a weak acid, for example, maleic acid or tartaric acid, is employed as condensing agent, the amounts are proportionately greater, and in practice vary between 10% and 100% by weight, based on the weight of the thiophene reactant, although, again, the total amount used may be many times the weight of thiophene in the charge. Generally speaking, it may be stated that the amount of condensing agent used in the method of the present invention varies inversely with the strength of the acid employed or with the strength of the acid produced by the hydrolysis of the salt employed.

In contrast with the reactions of the prior art involving thiophene and aldehydes, the concentration of the condensing agent used in the method of our invention must be rigidly controlled. For example, sulfuric acid which is a preferred condensing agent, is so active that polymerization, oxidation, etc., of the thiophene occur readily. Since, as stated hereinbefore, relatively only small amounts of sulfuric acid are necessary to carry out the condensation reaction of our invention, and since even small amounts of sulfuric acid cause the secondary reactions referred to, to occur to an appreciable extent, we have found it necessary to use sulfuric acid with suitable diluents. Accordingly, and by way of non-limiting examples, we may use 10% solutions of concentrated sulfuric acid in glacial acetic acid or 50% solutions of concentrated sulfuric acid in water, in quantities necessary to produce the desired amounts of sulfuric acid as condensing agent. Thus, as stated hereinbefore, the amount of sulfuric acid used can be many times (200% and above) by weight, the weight of thiophene in the charge provided that a sufficient amount of water is added so that the concentration of the aqueous sulfuric acid solution obtained is less than 80%, preferably, less than 60% sulfuric acid by volume, a concentration of 30% being especially preferred. Above 80% concentration aqueous solutions of sulfuric acid will cause sludgy resinification of thiophene itself. As mentioned hereinbefore, glacial acetic acid may be used as a diluent for the sulfuric acid, but the diluent effects of water and of glacial acetic acid are very different, acetic acid decreasing the condensation activity of condensing agents such as sulfuric acid and anhydrous hydrofluoric acid relatively little when compared with water. It must be noted that condensing agents such as anhydrous hydrochloric acid, maleic acid and tartaric acid do not ionize in anhydrous media having low dielectric constants, and hence, will not cause resinification in such media as will the ionizable sulfuric acid and anhydrous hydrofluoric acid. We have found that when glacial acetic acid is used as the diluent, the concentration of sulfuric acid in the glacial acetic acid-sulfuric acid solution should be less than 30%, and preferably less than 10%.

Since, then, in accordance with our invention, the concentration of the condensing agent used is a very important factor, it must be noted that the amount of condensing agent utilized is governed to some extent, by the character of the system. For example, other reaction variables being constant, if the system is anhydrous and if sulfuric acid is the condensing agent, water or glacial acetic acid must be added, prior to the addition of the condensing agent, in amounts to produce, when the appropriate amounts of sulfuric acid are ultimately added, a solution of condensing agent having a concentration falling within the ranges indicated hereinbefore. On the other hand, if water is present, sulfuric acid in amounts of at least 0.1% based on the weight of thiophene in the charge, but not exceeding an amount which would produce an aqueous solution of sulfuric acid in the charge greater than 80% concentration is used.

Any aldehyde or any aldehyde-containing material or any product obtained by subjecting aldehydes to polymerization reactions may be used as the aldehyde condensation reactant in the method of our invention. Formaldehyde, paraldehyde, paraformaldehyde, benzaldehyde, and formalin solutions may be mentioned by way of non-limiting examples, as suitable aldehyde condensation reactants. In the preferred embodiment of our invention, the manufacture of synthetic resins, we prefer to use formaldehyde or paraldehyde. We have found, however, that the nature of the aldehyde condensation reactant likewise affects the time and temperature required for effecting the desired condensation reaction. Other reaction variables remaining constant, the rate of condensation will be a maximum for low molecular weight aldehydes.

The ratio of aldehyde condensation reactant to thiophene controls the rate of condensation. We have found that a substantial excess of aldehyde reactant shows a tendency to shorten the reaction time and at the same time increases the yield of synthetic resin. Therefore, in general, we use a reaction mixture wherein the molar ratio of aldehyde reactant to thiophene is at least 1:1, respectively. Ordinarily, we prefer to use a charge in which the aldehyde reactant and thiophene are present in a molecular proportion falling within the range varying between 2:1 and 1:1, respectively, although under the conditions of condensation of the method of our invention, the condensation comprises reacting thiophene with an aldehyde reactant in a mole ratio of 1:1. If an excess of thiophene or of aldehyde reactant is employed, it can be recovered substantially quantitatively after completion of the reaction. Even if a charge in which thiophene and aldehyde reactant are present in mole proportions of two or more to one, respectively, is subjected to the condensation conditions of our invention, there is no evidence that compounds, such as dithienyl methane, are formed. Apparently, in accordance with the process of the present invention, the reaction will always involve one mole of aldehyde and one mole of thiophene, whether the thiophene or the aldehyde reactant are in molar excess over the other or not. In our method of carrying out the condensation of thiophene with aldehydes, the reaction products are invariably liquids that are insoluble in hydrocarbons, or resilient rubber-like masses or solid synthetic resins.

The temperature and time of reaction to be employed in the method of the present invention, as stated hereinbefore, must be carefully controlled. The temperature may vary between 20° C. and 120° C., although, ordinarily, we prefer to use temperatures varying between 40° C. and 100° C. As noted already, the temperature and time of reaction are governed to a considerable extent by the nature or magnitude of the other reaction variables, and predominantly, by the nature and concentration of the acid used as condensing agent, or by the nature and concentration of the acid produced by hydrolysis of the salt employed as condensing agent. Hence, the optimum temperature and time for effecting a given condensation reaction, in accordance with the method of the present invention, must be determined by one skilled in the art, the essential factor to be considered in addition to the temperature and time of reaction for obtaining the synthetic resins of our invention being the concentration of condensing agent employed.

In accordance with our invention, valuable synthetic resins may be obtained also by co-condensing thiophene and phenol with aldehydes. The proportion of thiophene to phenol in the charge may be changed at will to produce resins having a wide range of toughness and strength. The reaction in this case likewise involves one molecular weight of aldehyde for each molecular weight of phenol and of thiophene. As in the condensation of thiophene with aldehydes in accordance with the method of the present invention, the concentration of condensing agent and the condensation conditions are carefully controlled, the procedure for effecting the co-condensation of thiophene and phenol with aldehydes to produce valuable synthetic resins being similar to the procedure for effecting the condensation of thiophene with aldehydes.

As stated hereinbefore, in accordance with our invention we can produce liquid resins, resilient rubber-like resins, and solid resins. These products have properties that make them amenable to a wide variety of commercial applications. The liquid resins are insoluble in most organic solvents and can be cured into hard thermoset-type resins. They can be used in the paint industry, in the manufacture of laminated products, and can be applied to surfaces readily without the use of diluents. The resilient, rubber-like resins likewise can be cured under pressure and at elevated temperatures into hard thermoset-type resins, can be milled to produce a wide variety of thermosetting powders of varying degrees of comminution and having considerable industrial applications, and can be worked, pressed and extruded into any desired shape or form. Generally speaking, our synthetic resins possess not only all the desirable physical and chemical properties ordinarily associated with other well known synthetic resins, but also a toughness and strength not ordinarily found in, for example, phenolic resins. Our synthetic resins can be cast, molded and comminuted into a wide variety of finished and intermediate products of great usefulness in industry.

The relationship of each of the reaction variables will become apparent from the following examples and discussions thereof:

EXAMPLE 1

Seventeen grams of thiophene, 25 c. c. of a formalin solution containing about 36% formaldehyde (a 2:3 mole ratio), and 0.5 c. c. of sulfuric acid were placed in a glass tube, the tube was sealed and the mixture was shaken for 16 hours at a temperature of 85° C. 21.5 grams of a viscous, brown liquid were obtained. This liquid could be cast into a "thermosetting" resin.

EXAMPLE 2

Seventeen grams of thiophene, 25 c. c. of a formalin solution containing about 36% formaldehyde, and 10 grams of tartaric acid were placed in a glass tube, the tube was sealed and the mixture was shaken for 52 hours at a temperature of 85° C. 20 grams of a viscous, brown liquid were obtained. This liquid could be cast into a thermosetting resin.

The results of Examples 1 and 2 show that the nature of condensing agent employed affects the time required to effect adequate resinification. 5% of sulfuric acid, based on the weight of thiophene in the charge, causes resinification in 10 to 20 hours, whereas the run with 60% of tartaric acid, based on the weight of thiophene in the charge required from one and a half to two days.

EXAMPLE 3

Twenty-eight grams of thiophene, 41 c. c. of a formalin solution containing about 36% formaldehyde, and 12 c. c. of sulfuric acid were placed in a flask and the mixture was stirred for about 15 minutes. The initial temperature was 40° C. and the reaction took place with considerable evolution of heat. A substantially quantitative yield of rubbery, brown resin was obtained.

EXAMPLE 4

Twenty-four grams of thiophene, 15 grams of paraformaldehyde, 0.5 c. c. of sulfuric acid, and 5 c. c. of glacial acetic acid were placed in a flask and the mixture was stirred for about 15 minutes. A violent reaction commenced as soon as the temperature reached about 40° C. A substantially quantitative yield of a rubbery, brown resin was obtained.

The result of Example 4 shows that the concentration of condensing agent employed affects the time and temperature required to effect resinification. It must be noted that although 60% of sulfuric acid, based on the weight of thiophene in the charge, was used in Example 3, 28 grams of thiophene and 41 c. c. of formalin solution were employed in this example, as against 17 grams of thiophene and 25 c. c. of formalin solution employed in Example 1. In Example 3, resinification occurred in 15 minutes as compared to the 16 hours required in Example 1, when 5% of sulfuric acid was used. Moreover, as shown in Example 4, the amount of condensing agent employed in this example, 2% or less based on the weight of thiophene in the charge, is relatively small if the system is anhydrous, as is the case of Example 4 where paraformaldehyde was used instead of a formalin solution.

EXAMPLE 5

Seventeen grams of thiophene, 9 grams of paraldehyde, 0.5 c. c. of sulfuric acid, and 5 c. c. of glacial acetic acid were placed in a glass tube, the glass tube was sealed and the mixture was shaken for 16 hours at a temperature of 85° C. 22 grams of a viscous dark brown liquid that could be cast into a "thermosetting" resin was obtained.

EXAMPLE 6

Twelve grams of thiophene, 22 grams of benzaldehyde, 0.5 c. c. of sulfuric acid, and 5 c. c. of glacial acetic acid were placed into a glass tube, the glass tube was sealed and the mixture was shaken at a temperature of 85° C. 29 grams of a viscous black liquid which could be cast into a "thermosetting" resin were obtained after 36 hours of treatment.

The results of Examples 5 and 6 show that the nature of the aldehyde condensation reactant employed affects the time required to effect resinification. When paraldehyde was employed, as in Example 5, adequate resinification was achieved within 16 hours; on the other hand, 36 hours were required when benzaldehyde was employed as the aldehyde condensation reactant.

invention, it is possible to effect the co-condensation of thiophene and phenol with aldehydes, and that the proportion of thiophene to phenol to aldehyde in the charge may vary within wide limits. The manipulative steps of Examples 11 to 14, inclusive, are similar to those set forth in Example 7. For convenience, the data of Examples 11 to 14, inclusive, are set forth in Table II:

Table II

| Example | 11 | 12 | 13 | 14 |
|---|---|---|---|---|
| Weight of thiophene in grams | 21 | 21 | 17 | 12.5. |
| Weight of phenol in grams | 4 | 8 | 9.5 | 14. |
| Amount of formalin solution in c. c. | 25 | 28 | 25 | 25. |
| Molar ratio of thiophene to phenol | 6:1 | 3:1 | 2:1 | 1:1. |
| Condensing Agent | $H_2SO_4$ | $H_2SO_4$ | $H_2SO_4$ | $H_2SO_4$. |
| Amount of condensing agent in c. c. | 0.5 | 0.5 | 0.5 | 0.5. |
| Temperature in °C | 75 | 75 | 75 | 75. |
| Time of treatment in hours | 16 | 16 | 16 | 16. |
| Weight of product in grams | 22–23 | 26–27 | 27–28 | 26–27. |
| Nature of product | viscous, amber liquid. | viscous, amber liquid. | viscous, amber liquid. | hard, amber, thermoplastic solid.[1] |

TREATMENT OF PRODUCT

| | | | | |
|---|---|---|---|---|
| Temperature in °C | 170 | 170 | 170 | |
| Time in hours | 5–7 | 2–3 | 2–3 | |
| Pressure in lbs. per square inch | 250 | 250 | 250 | |
| Nature of final product | Dark amber, hard resin. | Translucent, dark amber, very hard resin. | Translucent, light amber, very hard resin. | |

[1] The solid will readily "set" thermally and it is substantially impossible to grind it into powder with a mortar and pestle.

EXAMPLE 7

Seventeen grams of thiophene, 16.5 c. c. of a formalin solution containing about 36% formaldehyde (a 1:1 mole ratio), and 0.5 c. c. of sulfuric acid were placed in a glass tube, the tube was sealed and the mixture was shaken for 16 hours at a temperature of 85° C. 19 grams of a viscous, brown liquid were obtained. This liquid could be cast into a "thermosetting" resin.

The results of Examples 1 and 7 show that when a molar excess of aldehyde condensation reactant is used in the charge, as in Example 1, greater yields of synthetic resin are achieved. Hence, it is preferable to carry out our condensation reaction using a substantial excess of aldehyde condensation reactant.

Examples 8, 9 and 10, together with Example 7, illustrate the fact that under the condensation conditions of our invention, the condensation reaction involves one mole of thiophene and one mole of aldehyde reactant. The manipulative steps of Examples 8, 9 and 10 are similar to those set forth in Example 7, and similar products were obtained in all the examples. To facilitate comparison, the data of Examples 8, 9 and 10 are tabulated, together with those of Example 7, in Table I.

Table I

| Example | 7 | 8 | 9 | 10 |
|---|---|---|---|---|
| Weight of thiophene in grams. | 17 | 21 | 28 | 42. |
| Amount of formalin solution in c. c. | 16.5 | 16.5 | 16.5 | 16.5. |
| Molar ratio of thiophene to formaldehyde. | 1:1 | 5:4 | 5:3 | 5:2. |
| Condensing Agent | $H_2SO_4$ | $H_2SO_4$ | $H_2SO_4$ | $H_2SO_4$. |
| Amount of condensing agent in c. c. | 0.5 | 0.5 | 0.5 | 0.5. |
| Temperature in °C | 85 | 85 | 85 | 85. |
| Time of treatment in hours. | 16 | 16 | 16 | 16. |
| Weight of product in grams. | 19–20 | 19–20 | 19–20 | 19–20. |
| Weight of unreacted thiophene recovered in grams. | | | 13–15 | 25–27. |

Examples 11 to 14, inclusive, illustrate the fact that under the condensation conditions of our The effect of thiophene on the properties of the product obtained in the co-condensation of thiophene and phenol with aldehydes is illustrated by the following example:

EXAMPLE 15

Fourteen grams of phenol, 10 c. c. of a formalin solution containing about 36% formaldehyde, and 0.1 c. c. of sulfuric acid were placed in a glass tube, the glass tube was sealed and the mixture was shaken for 16 hours at a temperature of 75° C. 15 to 16 grams of very brittle, pale amber, thermoplastic solid were obtained. In contrast to the solid obtained in Example 14, this solid could be ground into powder with a mortar and pestle, in a matter of seconds.

It must be noted also, that the thiophenic resins of our invention can be obtained in the rubber-like modification. This is not known for phenolic resins. Accordingly, we have found that even in the ultimate stage of resinification, our thiophenic resins are more resilient and less brittle than the phenolic resins.

EXAMPLE 16

A solution of 8 g. of $H_2SO_4$ in 16 g. of water (approximately 32% $H_2SO_4$) was added to a mixture of 84 g. thiophene and 45 g. paraldehyde and heated with stirring for 72 hours. Periodically, more paraldehyde was added to replace that which had decomposed to acetaldehyde and evaporated out of the system. The long run duration was necessary to effect the reaction because the acetaldehyde in the system kept the reflux temperature down to about 60° C. The product was then separated from the acid layer, washed well with water, dried, and the unreacted thiophene removed by distillation. Forty grams of a dark, viscous, benzene-soluble resin was obtained.

For many purposes, we prefer to carry out the condensation reaction to the first stage of resinification. The liquid product thus formed is separated from water and acid and is dried in a vacuum at moderate temperatures, of the order of 50° C. to 100° C. The dried liquid may be cured or thermoset in the manner of "cast" resins, by a heat treatment of several hours, of the order of 2 to 8 hours, at temperatures varying between about 140° C. and about 200° C., and under pressures varying between about 50 pounds per square inch and about 200 pounds per square inch; or, as a laminating agent, the dried liquid, with or without suitable fillers and the like, may be cured or thermoset in the manner of "Compression Molded Resins", by a heat treatment of several minutes, of the order of 1 to 15 minutes, at temperatures varying between about 140° C. and about 180° C., and under pressures varying between about 1000 pounds per square inch and about 3000 pounds per square inch. These resins have been found to have tensile strengths that are greater than 5000 pounds per square inch.

For many other purposes, we prefer to carry out the condensation reaction to the second stage of resinification. The resilient rubber-like masses thus formed are washed and dried and then milled to the desired consistency with appropriate fillers, hardeners, plasticizers, pigments, and the like. They are then "compression molded" by a heat treatment of several minutes, of the order of 1 to 15 minutes, at temperatures varying between about 140° C. and about 180° C., and under pressures varying between about 1000 pounds per square inch and 3000 pounds per square inch. These synthetic resins have been found to have a Rockwell hardness of greater than 90.

Generally speaking, the properties of the cured products depend primarily upon the temperature and duration of the condensation reaction, upon the nature of the acidic condensing agent employed, upon the temperature of dehydration, and upon the time and temperature of the curing treatment.

This application is a continuation-in-part of application Serial Number 524,622, filed March 1, 1944, now abandoned.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

We claim:

1. The method of preparing synthetic products, which comprises reacting thiophene with an aldehyde selected from the group consisting of formaldehyde and paraldehyde, in a molar ratio corresponding to at least one mole of aldehyde for each mole of thiophene, in the presence of sulfuric acid in amounts of at least 0.1% based on the weight of thiophene, and of water to produce an aqueous solution of sulfuric acid of less than 80% concentration, at temperatures varying between 20° C. and 120° C., and for a period of time sufficient to effect resinification.

2. The method of preparing synthetic products, which comprises reacting thiophene with an aldehyde selected from the group consisting of formaldehyde and paraldehyde, in a molar ratio corresponding to at least one mole of aldehyde for each mole of thiophene, in the presence of sulfuric acid in amounts of at least 0.1% based on the weight of thiophene, and of water to produce an aqueous solution of sulfuric acid of less than 60% concentration, at temperatures varying between 40° C. and 100° C., and for a period of time sufficient to effect resinification.

3. The method of preparing synthetic products, which comprises reacting a mixture of thiophene and phenol wherein the molar ratio of thiophene to phenol varies between 6:1 and 1:1, with an aldehyde selected from the group consisting of formaldehyde and paraldehyde, in a molar ratio corresponding to at least one mole of aldehyde for each mole of thiophene and at least one mole of aldehyde for each mole of phenol in said mixture, in the presence of sulfuric acid in amounts of at least 0.1% based on the weight of thiophene in said mixture, and of water to produce an aqueous solution of sulfuric acid of less than 80% concentration, at temperatures varying between 20° C. and 120° C., and for a period of time sufficient to effect resinification.

4. The method of preparing synthetic products, which comprises reacting a mixture of thiophene and phenol wherein the molar ratio of thiophene to phenol varies between 6:1 and 1:1, with an aldehyde selected from the group consisting of formaldehyde and paraldehyde, in a molar ratio corresponding to at least one mole of aldehyde for each mole of thiophene and at least one mole of aldehyde for each mole of phenol in said mixture, in the presence of sulfuric acid in amounts of at least 0.1% based on the weight of thiophene in said mixture, and of water to produce an aqueous solution of sulfuric acid of less than 60% concentration, at temperatures varying between 20° C. and 100° C., and for a period of time sufficient to effect resinification.

5. The product obtained by reacting thiophene with an aldehyde selected from the group consisting of formaldehyde and paraldehyde, in a molar ratio corresponding to at least one mole of aldehyde for each mole of thiophene, in the presence of sulfuric acid in amounts of at least 0.1% based on the weight of thiophene, and of water to produce an aqueous solution of sulfuric acid of less than 60% concentration, at temperatures varying between 40° C. and 100° C., and for a period of time sufficient to effect resinification.

6. The product obtained by reacting a mixture of thiophene and phenol wherein the molar ratio of thiophene to phenol varies between 6:1 and 1:1, with an aldehyde selected from the group consisting of formaldehyde and paraldehyde, in a molar ratio corresponding to at least one mole of aldehyde for each mole of thiophene and at least one mole of aldehyde for each mole of phenol in said mixture, in the presence of sulfuric acid in amounts of at least 0.1% based on the weight of thiophene in said mixture, and of water to produce an aqueous solution of sulfuric acid of less than 60% concentration, at temperatures varying between 20° C. and 100° C., and for period of time sufficient to effect resinification.

PHILIP D. CAESAR.
ALEXANDER N. SACHANEN.

No references cited.